(No Model.) 5 Sheets—Sheet 1.

A. RANK
MOWING AND REAPING MACHINE.

No. 256,048. Patented Apr. 4, 1882.

WITNESSES
Aug. Jordan
L. H. Marshall

By his Attorney

INVENTOR
Amos Rank.

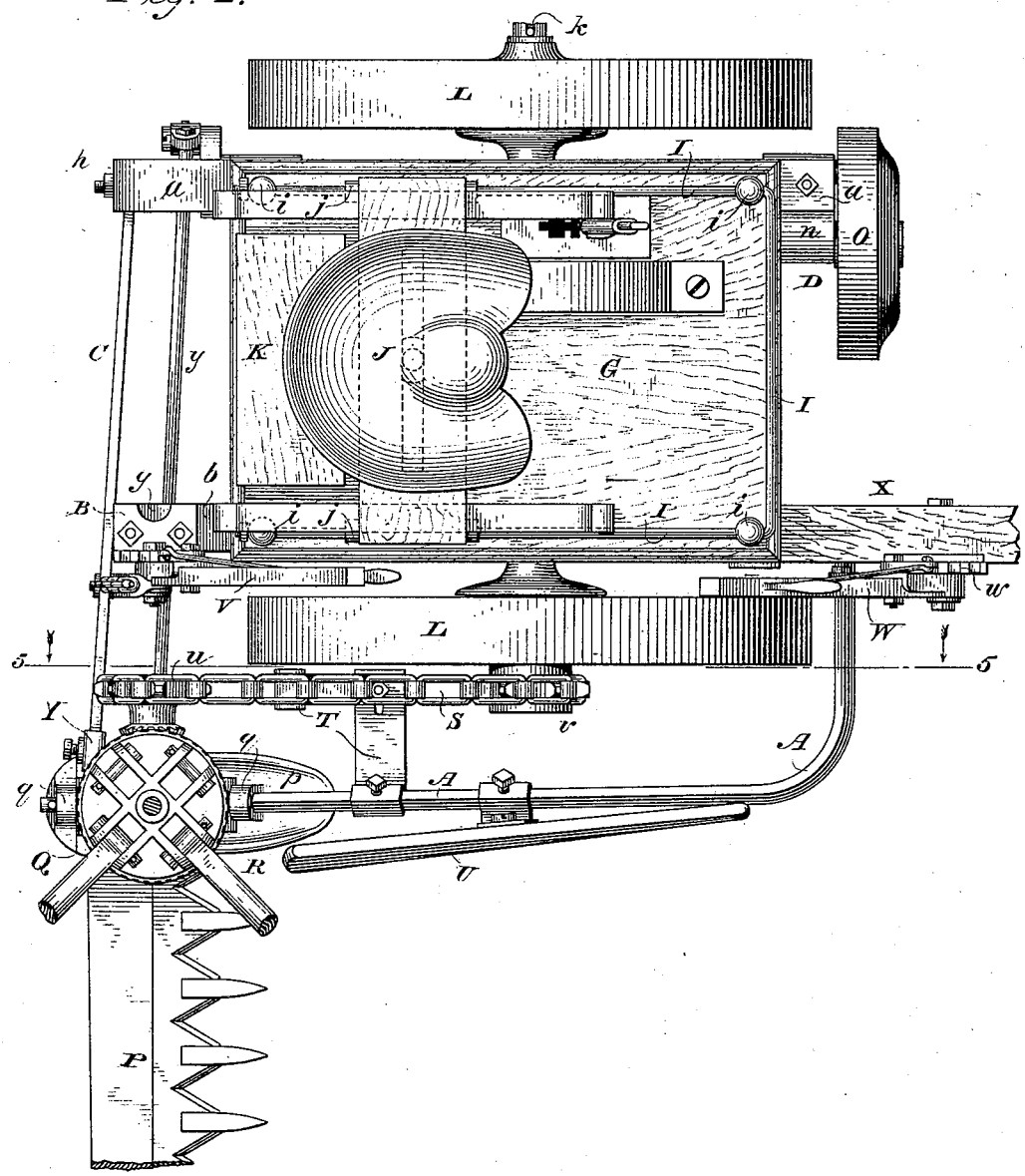

(No Model.) 5 Sheets—Sheet 3.
A. RANK.
MOWING AND REAPING MACHINE.
No. 256,048. Patented Apr. 4, 1882.
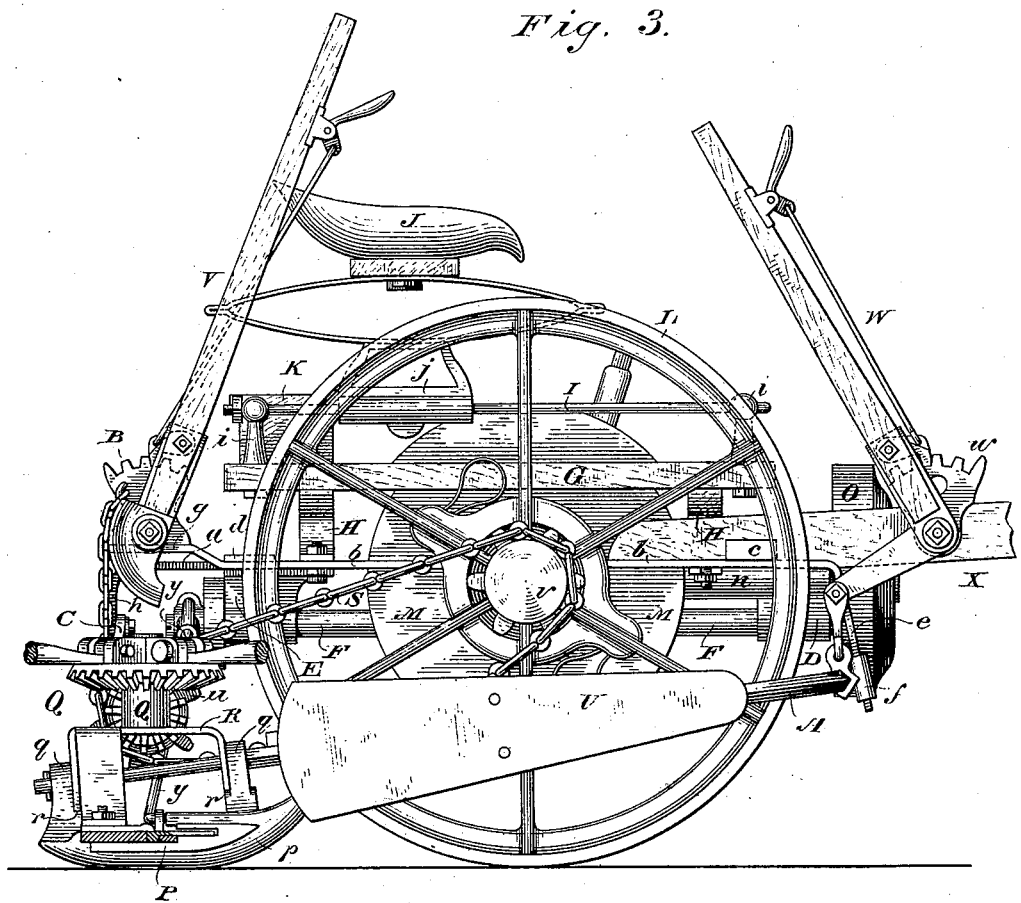
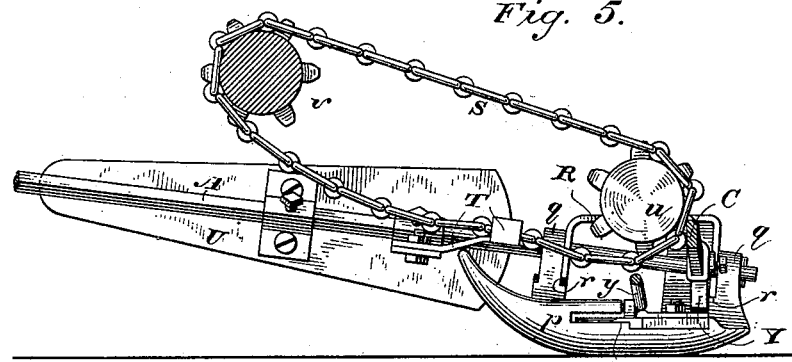
WITNESSES
Aug^s Jordan
L. H. Marshall
his Attorney
INVENTOR
Amos Rank.

(No Model.) 5 Sheets—Sheet 4.

A. RANK.
MOWING AND REAPING MACHINE.

No. 256,048. Patented Apr. 4, 1882.

WITNESSES
Aug. Jordan
L. H. Marshall his Attorney

INVENTOR
Amos Rank.

(No Model.) 5 Sheets—Sheet 5.

A. RANK
MOWING AND REAPING MACHINE.

No. 256,048. Patented Apr. 4, 1882.

WITNESSES
Aug S. Jordan
L. H. Marshall

By his Attorney.

INVENTOR
Amos Rank.

UNITED STATES PATENT OFFICE.

AMOS RANK, OF SALEM, OHIO.

MOWING AND REAPING MACHINE.

SPECIFICATION forming part of Letters Patent No. 256,048, dated April 4, 1882.

Application filed August 25, 1880. (No model.)

*To all whom it may concern:*

Be it known that I, AMOS RANK, of Salem, in the county of Columbiana and State of Ohio, have invented a new and useful Improvement in Mowing and Reaping Machines, of which the following is a full and exact description.

The points of novelty in this improvement are—

First. The rectangular main frame, constructed of wrought-iron, having the rear end of the left-hand side piece projecting out past the main body of the frame and bent downward in a curve, terminating in an ear, to which may be jointed the upper end of the rear coupling-brace, the rear end of the right-hand side piece projecting out past the main body of the frame and upward, terminating in a flat seat for the hoisting-lever ratchet, the front end of the right-hand side piece projecting out past the main body of the frame and then bent downward, forming a guide, on which a drag-bar socket slides up and down to rock or roll the cutting apparatus. This main frame is strengthened and stiffened by two corner-pieces, of cast metal, formed with right-angled projections, which are bolted or riveted to the longitudinal and transverse members of the main frame, and having downward projections, terminating in barrel-bearings for the crank-shaft; and it is further strengthened and stiffened by the frame-cover or platform being bolted to it by means of the spanning steps or girders under the platform and the railing or guard on and around the top.

Second. The inside grain-board, made movable and adjustable on the square-shaped drag-bar by a sliding sleeve fitted on the drag-bar, and held in position by a set-screw.

Third. The spring chain-guide, made removable and adjustable on the square-shaped drag-bar by a sliding sleeve fitted on the drag-bar, and held in position by a set-screw.

That others may understand my improvement, I will particularly describe it, having reference to the accompanying drawings, wherein—

Figure 1:
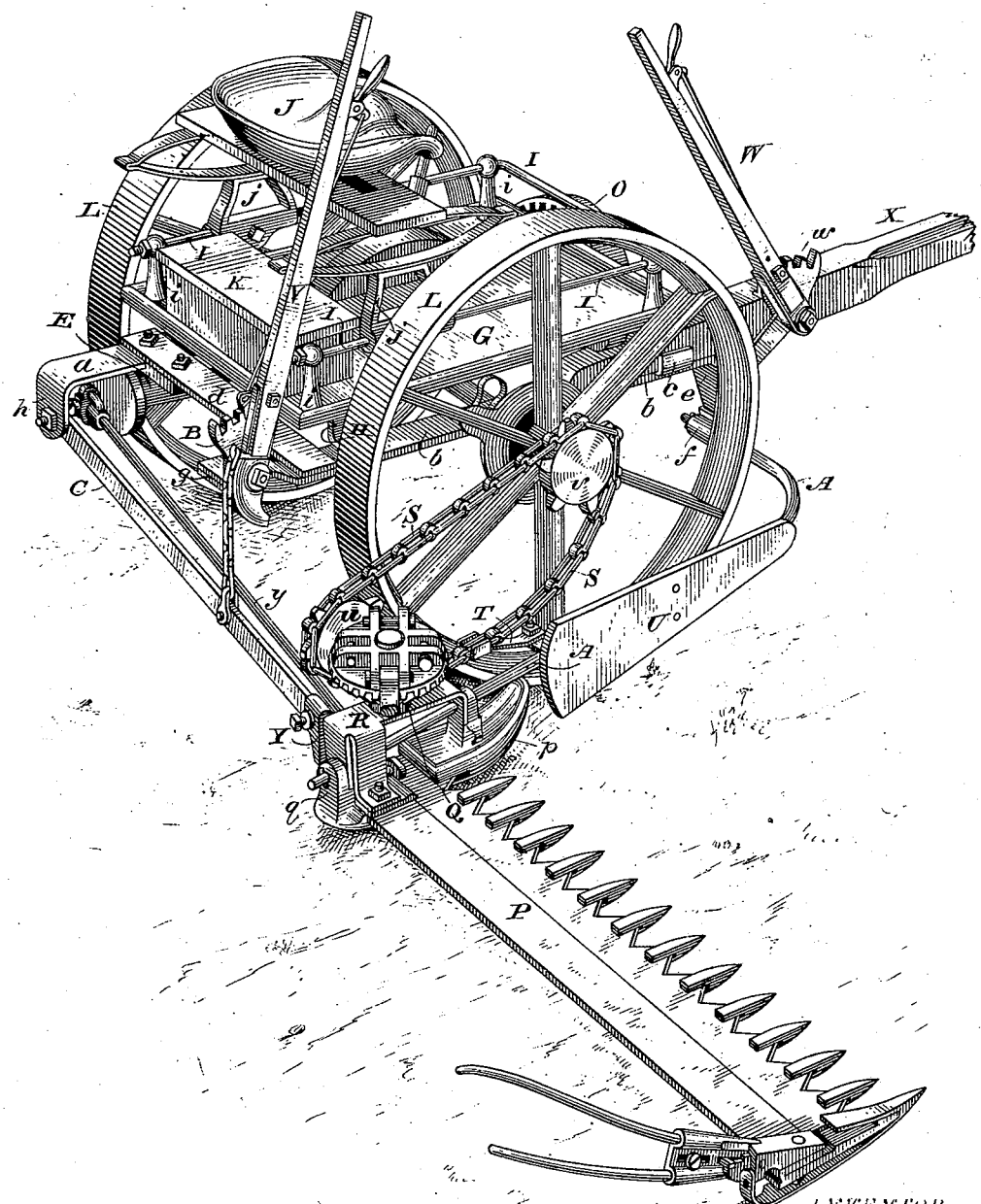
Figure 4:
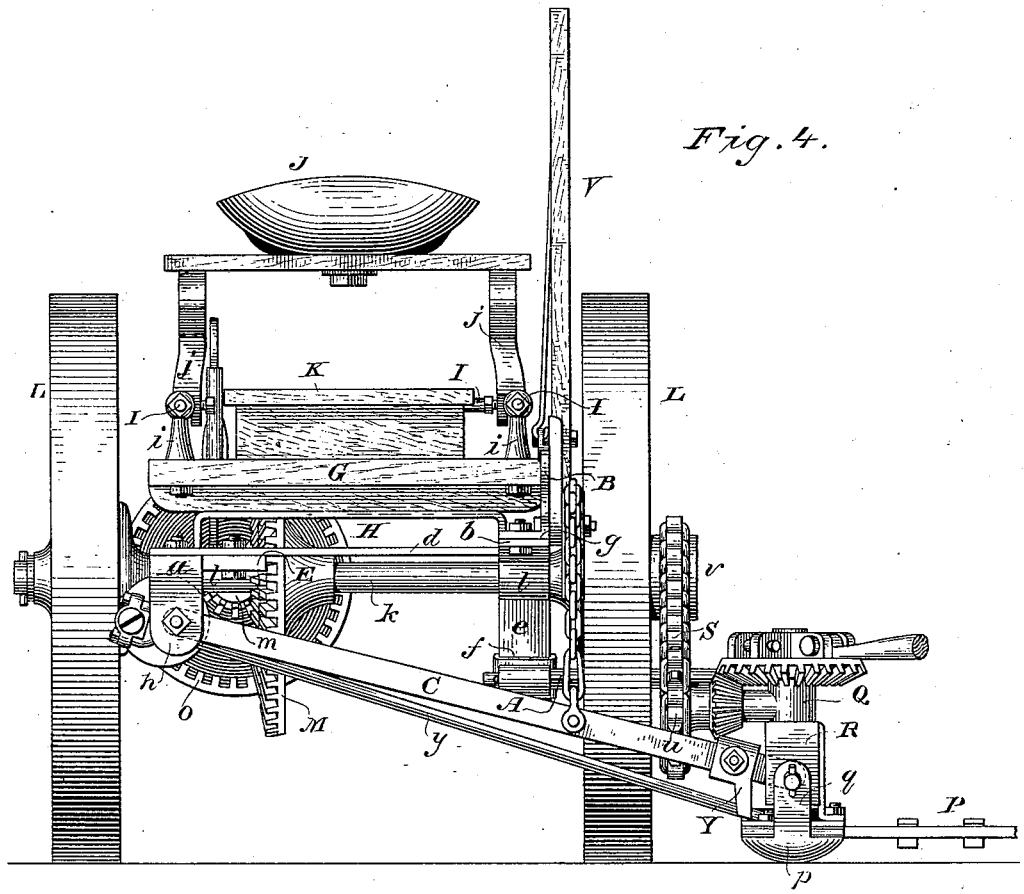
Figure 6:
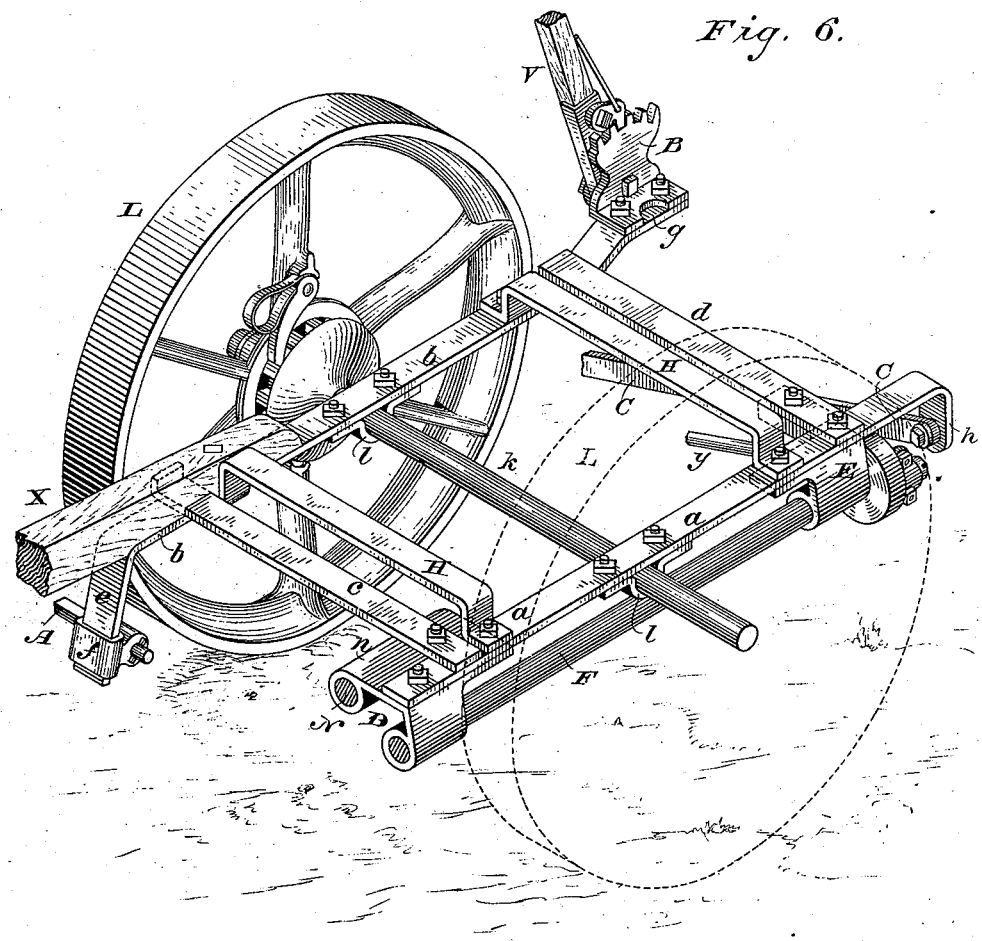
Figure 7:
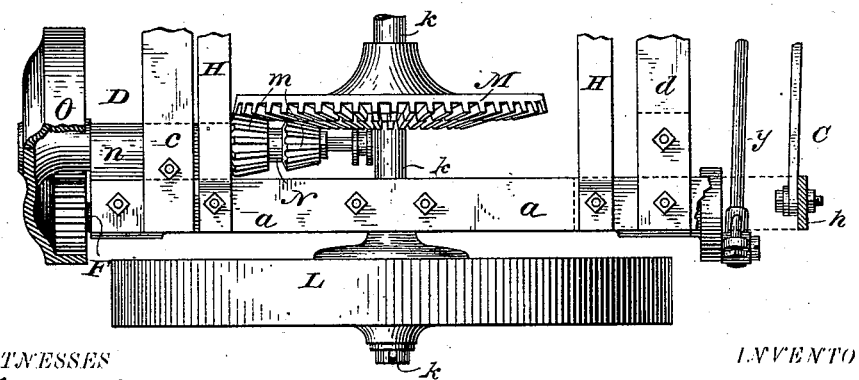

Figure 1 is a perspective view of my machine. Fig. 2 is a plan view of the same with the finger and cutter bar broken away. Fig. 3 is a side elevation as seen from the grain side of the machine. Fig. 4 is a rear elevation. Fig. 5 is a view, partly in elevation and partly in section on the line 5 5 of Fig. 2, of the grain-board, drag-bar, shoe, &c., as seen from the stubble side of the machine. Fig. 6 is a perspective view of my improved frame, the platform, gearing, &c., being removed. Fig. 7 is a detail view of the gearing.

The main frame is composed of two side bars, $a\ b$, and two transverse or end bars, $c\ d$. These bars are flat and made of wrought metal. The transverse bars $c\ d$ extend only across the frame, and at their ends they are lapped over and riveted or bolted securely to the side bars, $a\ b$. The side bars project at their ends past the end bars, and said projected ends serve special purposes—to wit, the forward end of the side bar $b$ projects beyond the frame, and is turned downward to form a guide, $e$, for the slide $f$, which carries the forward end of the drag-bar A. The rear end of the side bar $b$ is turned upward and forms a flat seat, $g$, whereon to bolt the segment-rack plate B. The bar $a$ projects at its rear end, and is turned downward to form an ear, $h$, to which the rear brace or coupling-arm, C, may be pivoted.

At one side the corners of the main frame are braced and stiffened by cast-iron pieces D E, which are firmly bolted or riveted to the frame. These cast-iron pieces have pendent portions, which form the boxes or bearings for the front and rear ends of the crank-shaft F, respectively.

The platform is constructed of wood securely fastened to the girt H, and further guarded and strengthened by a foot-brace, I, formed of a rod of iron, continuous along three sides of the platform and supported on the corner-posts $i\ i$.

The driver's seat J is mounted upon frames $j$, which are fitted to slide upon the side portion of the rail I, so that the weight of the driver may be moved forward or backward, as may be required, to balance the machine. The tool-box K is conveniently located at the back of the platform G, beneath the driver's seat.

The main frame is supported upon two driving-wheels, L, and a main axle, $k$, which turns in boxes $l$, bolted to the side bars, $a\ b$, respectively. The axle $k$ has a bevel-wheel, M, mounted upon it between the side bars, $ab$, and said wheel meshes with a suitable bevel-pinion, $m$, which is mounted upon the countershaft N. The shaft N is mounted in a long box, $n$, which is also formed upon or integral with the corner-piece D. At the front end the shaft N is provided with the cap-wheel O, having internal gear-teeth meshing with the pinion $o$ on the crank-shaft F, whereby motion is communicated from the main wheels L to the crank-shaft F. The corner-piece D having cast upon it the two boxes for the countershaft N and crank-shaft F renders it impossible for said shafts to get out of parallelism, even when the joints of the frame may become loosened or out of square.

The cutting apparatus P is of some ordinary and proper description. At its inner end it is secured to a shoe, $p$, which is supported laterally by the brace C and longitudinally by the drag-bar A. The rear end of the drag-bar is cylindrical and passes through the lugs $q\,q$ on the shoe P, so that said shoe and the cutting apparatus attached thereto may turn upon said drag-bar as upon a hinge. The cylindrical portion of said drag-bar also passes through the outer end of the brace C, so that the movements of the shoe upon said axis do not affect the position of said brace.

The drag-bar A is formed of bar having a rectangular cross-section, preferably square, and at its front end it is bent around sidewise to enter in a lateral direction the box on the slide $f$, whereby the front end of said drag-bar may be raised or lowered to tilt the points of the fingers up or down, as may be desired. The drag-bar A is bent cornerwise, so as to present its deepest section-line in the direction of greatest strain, both vertically and laterally, and thereby metal and weights are economized to the utmost.

At the inner sides of the lugs $q\,q$ there are shoulders or ledges $r$, against which the lower ends of the bridge-piece R rest. Said bridge is retained in place by the drag-bar A, which passes through holes $s$ made in ends, which are turned downward, as shown, to rest on said ledges $r$. Said bridge is made from a plate of wrought metal, and is provided on its outer side, at the rear end, with a third foot, which extends downward and is bolted to the shoe. The rake-stand Q is mounted upon this bridge, and is constructed in some approved way. The rake is driven by a chain, S, which connects the sprocket-wheel $u$ on the rake-stand with a similar sprocket-wheel, $v$, on the hub of the inner wheel, L, and thereby the rake and reel are actuated. It is necessary to provide a chain-guide for the lower and slack part of the chain S, both to keep it from entanglement with weeds and grass and to prevent it from swinging as the machine moves forward, whereby it might be prevented from proper engagement with its sprocket. Such a guide is shown at T. It is mounted on an elastic arm, and is secured to a sleeve which fits and slides upon the rectangular drag-bar A. The grain-board U is likewise mounted upon the drag-bar A, and secured thereto by a sleeve which fits and slides upon said bar. The grain-board U as well as the guide T are provided with set-screws whereby they may be fixed in position.

The lifting-lever V is pivoted to the side of the segment-rack B, and is provided with the usual segment-lever and chain, the lever end whereof is shackled to the coupling-arm C to lift the inner end of the cutting apparatus at will.

The lifting-lever W is pivoted to the side of the segment-rack $w$ at the side of the tongue X, and the bell-crank arm at the lower end of said lever W is linked to the slide $f$, so that it may be raised or lowered at will.

An adjustable stop, Y, is mounted upon the coupling-arm C, to arrest the axial motion of the shoe when it is raised from the ground and cause the outer end of the cutting apparatus to be raised up likewise.

The pitman $y$ is pivoted at one end to the crank-wheel at the rear end of crank-shaft F, and at its other end it is pivoted to the heel of the cutter-bar, as usual.

Having described my invention, what I claim as new is—

1. A rectangular main frame for a mowing or reaping machine, made wholly of wrought metal and the ends of the side bars projecting as described, to wit: the rear end of the left-hand side piece projecting outward and downward, the rear end of the right-hand side piece projecting outward and upward, and the front end of the right-hand side piece projecting outward and downward, substantially as and for the purpose shown and described.

2. In a two-wheeled hinge-joint mowing or reaping machine, a vibrating drag-bar constructed of an iron rod having a rectangular cross-section, combined with the adjustable and removable grain-board, substantially as shown and described.

3. The combination, in a two-wheeled hinge-joint mowing or reaping machine, of a vibrating drag-bar constructed of square-shaped iron with the adjustable and removable spring chain-guide mounted on said drag-bar, substantially as shown and described.

AMOS RANK.

Witnesses:
HENRY C. JONES,
JOHN E. ROGERS.